United States Patent [19]

Sigel

[11] Patent Number: 4,785,512
[45] Date of Patent: Nov. 22, 1988

[54] MACHINE FOR REPAIRING AND SEALING CONDUITS

[76] Inventor: Alwin Sigel, 8418 Schlatt, Switzerland

[21] Appl. No.: 68,343

[22] Filed: Jul. 1, 1987

[30] Foreign Application Priority Data

Mar. 31, 1987 [CH] Switzerland ............... 222/87

[51] Int. Cl.⁴ .................. B23P 17/00; E03F 3/06
[52] U.S. Cl. .................. 29/33 T; 166/55.2; 409/143
[58] Field of Search ......... 29/33 T, 558; 409/143, 409/190; 51/241 R, 245; 175/78, 77; 166/55

[56] References Cited

U.S. PATENT DOCUMENTS

| | | | |
|---|---|---|---|
| 4,197,908 | 4/1980 | Davis et al. | 409/143 |
| 4,442,891 | 4/1984 | Wood | 409/143 X |
| 4,577,388 | 3/1986 | Wood | 29/558 |
| 4,630,676 | 12/1986 | Long | 409/143 X |
| 4,648,454 | 3/1987 | Yarnell | 409/143 |
| 4,657,450 | 4/1987 | örner et al. | 409/143 |
| 4,701,988 | 10/1987 | Wood | 29/33.7 |

FOREIGN PATENT DOCUMENTS

| | | | |
|---|---|---|---|
| 3446055 | 6/1986 | Fed. Rep. of Germany | 409/143 |
| 698726 | 12/1979 | U.S.S.R. | 409/143 |
| 854610 | 8/1981 | U.S.S.R. | 409/143 |

Primary Examiner—William R. Briggs
Attorney, Agent, or Firm—Wegner & Bretschneider

[57] ABSTRACT

The invention in question is a repairing machine, which is suited to repairing damaged conduits which are inaccessible for repair work. This repairing machine is remote-controlled and monitored with television cameras. At the head of the driving carriage, various devices, which are necessary for the repairs, can be attached to a motor-driven rotatable toolhead. A simple construction of the movable head has made it possible to accomplish all of the necessary movements with uncomplicated mechanics, and at the same time, to forego a tedious slide coupling for the control lines without letting them get tangled with the device. Therefore, with this invention, the production costs for the whole device could be lowered and, likewise, the proneness to repairs could be reduced.

7 Claims, 1 Drawing Sheet

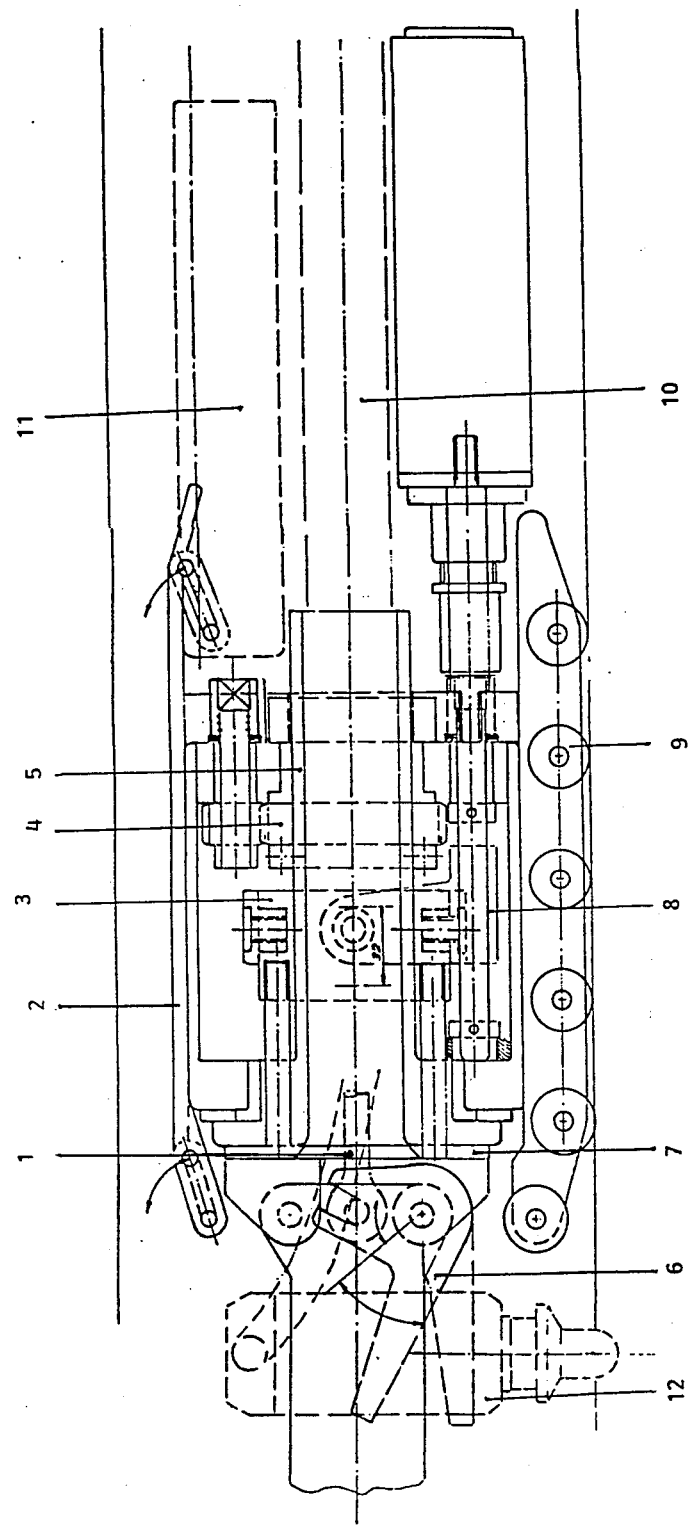

MACHINE FOR REPAIRING AND SEALING CONDUITS

DESCRIPTION OF THE PROBLEM

A solution had to be found on how to repair damaged conduits when they are too small in diameter and therefore inaccessible for reparation. The solution lay in a remote control machine which can execute the following tasks:

1. Preparation for the Repairing:

The damaged areas must be machined and cleaned. This includes tasks such as drilling out, brushing out, washing and siphoning.

2. Actual Repairing:

This includes putting in various filling materials such as plastics, adhesives or other materials, which have been made for these special applications by cement chemistry.

All of these said tasks require numerous supply lines which one must be able to interchange simply and quickly. Furthermore, such a repairing machine must possess the following abilities:

1. The tool must be able to be moved three-dimensionally, which includes:

running in the axial direction of the pipe rotation about the axis of the pipe radial shifting of the tool or toolholder from the center of the pipe to the wall of the pipe or vice versa.

2. It must be possible to inject products into or machine certain areas with the movements named in point 1.

A further important problem, which additionally had to be solved, was the solution to the problem of how one can lead the various, occasionally thick supply lines through the narrow pipe past the machine, which takes up a lot of space, and connect them to the rotating tool holder, which is located at the head of the vehicle, without having to use complicated rotating joints which are prone to break down.

STATE OF THE TECHNOLOGY

Such vehicles have already been developed since 1976 by the applicant for this patent, which is a front-ranker in this area. See, for example, Swiss Pat. No. 7618/80-6, filed Oct. 13, 1980, to Sigel. This is a model which is suitable for sealing normal, damaged areas somewhere in the pipe, as well as for the more difficult sealing of damaged forks.

It is possible with this, as well as with further designs to simultaneously execute a rotation about the axis of the pipe and a radial movement towards the center of the pipe or towards the wall of the pipe, using a camera or a tool. Such further developments, which consist of a carriage equipped with a driving mechanism, a television camera and a tool holder, and are constructed for repairing damaged pipes, were already shown by the patent applicant before 1984 in exhibitions and demonstrations in Switzerland, as well as abroad. This includes demonstrating this remote-controlled rotation component in Berne, in Friederichshafen, at the Ingenieur-deville Conference in Bordeaux and at the Entsorga in the Gruga Hall in Essen, just to mention a few examples.

A quick follow-up on this project was hindered at first by serious shortcomings in the chemistry of repairing. It has particularly been demonstrated that the sealing gel employed up to now (e.g. Penetrin) dries out very fast because it contains around 70% water, and thus, gets brittle within a short time as soon as the ground water level temporarily sinks. Fine hair cracks develop in the dried out sealing material and ruin the extremely expensive repair work after a short time.

This is why no really satisfactory repairing machines for repairing and sealing inaccessible conduits have existed on the market until today. Especially the problem of how to realize the complicated mechanics, required for simultaneous rotational and radial movements of the toolhead, in a simple way, was not and could not be solved.

INVENTION IN QUESTION

With the invention in question, a repairing machine has been successfully constructed, in which all of the disadvantages mentioned have been eliminated. It has particularly been succeeded to construct a movable head which solves all of these movements, such as axial rotation and radial shifting, with very simple mechanics. At the same time, a complicated rotating joint, prone to defects, can be foregone by leading the supply lines centrally through the machine. In other constructions, in which the supply lines were led around the machine in a zigzag and inevitably became tangled during rotation of the head, an execution without rotating joints was out of the question. Now, however, with the new type of construction at hand, having a central channel for the lines, the twisting can be intercepted by the remaining lines behind the robot vehicle.

With this new design, a device has been found which fulfills all requirements, and with which, for example, TV inspections, machining or product injections can be executed with no problem in inaccessible pipes or cavities. This, however, is also due to the fact that, besides the general surveying camera, an additional detail camera was mounted onto the tool plate, with which the area to be machined can be observed close up. Also the fact that rotations of over 360° are possible aids in being able to execute repairs on the seams to the full extent, and therefore neatly, without leaving untidy edges at the beginning or end of the seams.

BRIEF DESCRIPTION OF THE DRAWING

The drawing FIGURE is a top view of a robot vehicle in accordance with this invention.

The fundamental component of this robot vehicle thus consists of the driving carriage as it is already known from the patent dated Oct. 13, 1980. This is, however, additionally equipped with a motor-driven rotatable toolhead for placing tools or repair materials.

Repairing machines of various sizes can be employed for repair work in the lines. For pipes and lines with a diameter of 30 cm and less, a model is employed, which is driven by an additional motorized carriage and thus has no driving motor of its own for the wheels. For pipes with a diameter of more more than 30 cm, a larger model can be employed, which has its own drive and is intended for individual-wheel drive as each wheel has its own motor. Depicted in the drawing is the top view of the smaller robot vehicle, in which it is clearly shown that the control lines 10 for hydraulics, water, air, sealing material and the supply line for the television camera, etc. are no longer led around the vehicle on the outside, but instead, centrally through the vehicle. During rotation of the entire rotation component, incl. the revolving platform 7, together with both of the "duck bills" 6 on which the tools can be mounted, and the television, the control lines no longer get wound around the vehicle, but instead, the entire line simply experiences a small torsional rotation. This torsional rotation is achieved by a geared engine which turns the central rotation element 5 together with the control lines over a turntable 4. This rotation is controlled by an electric brain and the pilot valve in the steering-control holder 11. In this way, a rotation of at least 420° can be achieved by the new device at hand, as such a large rotation can be offset by the rest of the control line between the take-up coil and the robot vehicle.

As previously mentioned, there is a revolving platform 7, on which two turnable lever arms, or "duck bills", 6 are mounted, attached to the central rotation element 5. Various tools such as drill, injector, television camera, etc. can be mounted on these "duck bills" 6. A pneumatic drilling device 12 with a diamond drill is depicted in the drawing. During rotation of the rotation component with the control lines 10, the whole revolving platform 7, including the instruments mounted on it, likewise rotates. Now only a radial movement of the "duck bills" 6 is necessary so that the devices mounted on them can reach the inner wall of the pipe which must be repaired. This is accomplished in that both of the "duck bills" 6, which display movable lever arms, can be turned by thrusting rods 1. Both of the thrusting rods are set into thrusting movements by a geared motor over a sleeve 3.

As previously mentioned, the robot vehicle is equipped with two cameras. The first of these two is a large surveying camera, which can be swivelled towards the front in order to see in the running direction. It can also be turned backwards, however, so that the whole robot vehicle can be observed during the work. In this way, all movements of both "duck bills" 6, along with the instruments mounted on them, can be observed. Besides this large surveying camera, a smaller detail camera is mounted on the "duck bills" 6, with which the corresponding processes such as drilling or injection of plastic sealing material, for example, can be precisely observed close up.

As shown by the previous description, the mounted, movable "duck bills" 6, the thrusting rods 1 and the control lines 10 being run through the center of the robot vehicle have made it possible to successfully replace the more expensive apparatus, available up to now on the market, with a very simple construction. The consequence of this is that, in the future, the production costs for the whole device can be massively lowered and that the proneness to repairs will rapidly decrease.

I claim:

1. A remote control device for repairing and/or sealing conduits, said device comprising:
    a wheeled undercarriage, said undercarriage being movable into the conduits and having a central longitudinal axis;
    a rotatable hollow shaft arranged within said undercarriage and concentric to said undercarriage, said shaft being rotatable around said central axis;
    a motor for driving the rotational movement of said shaft; and
    a plurality of mounting components for interchangeably mounting the desired repairing and/or sealing equipment, said components being fitted at one end of said shaft, the supply lines for the repairing and/or sealing equipment being torsionally flexible and at least one end thereof being located within said shaft, means providing for at least one of said mounting components to be movable radially from the shaft within the conduit to effect the repair and/or sealing work.

2. Machine according to claim 1, characterized by the fact that, on said end, the hollow shaft (5) bears a radial flange, on which the mounting components (6) are mounted.

3. Machine according to claim 1, characterized by the fact that each of the movable mounting components (6) is an arm of an angle lever which can be swivelled about the axis substantially perpendicular to the axis of the hollow shaft (5) and on whose other arm a motor-driven, axially movable connecting rod (1), placed substantially parallel to the axis of the hollow shaft (5), operates.

4. Machine according to one of the claim 1, characterized by the fact that on said end of the hollow shaft (5), a carrier is mounted for a surveying television camera which cannot be radially shifted.

5. Machine according to one of the claim 1, characterized by the fact that the axles of the wheels (9) have individual drive motors.

6. A device according to claim 1, wherein said undercarriage is manually driven.

7. A device according to claim 1, wherein said undercarriage is motor driven.

* * * * *